United States Patent Office 3,202,922
Patented Aug. 24, 1965

3,202,922
TRANSISTOR CHOPPER
Lucien Amedé De Schamphelaere, Edegem-Antwerp, Belgium, assignor to Gevaert Photo-Producten N.V., Mortsel, Belgium, a Belgian company
Filed Apr. 3, 1961, Ser. No. 100,203
Claims priority, application Netherlands, Apr. 6, 1960, 250,239
3 Claims. (Cl. 330—9)

The present invention relates to a transistor chopper in a device for converting voltage into current. More particularly it relates to a transistor chopper in a device for converting small D.C. voltages into a proportional D.C. current according to the principle of the feedback method. According to this method the voltage, which is produced by the proportional output of D.C. current across a compensation resistor in the output circuit, is fed back to the input of the converting device for use in compensating the D.C. voltage which is to be converted.

Such devices, also known as chopper-type D.C. amplifiers, are frequently used in most of the modern electronic process control systems for converting small output D.C. voltages from measuring elements, such as thermocouples, resistance thermometers with associated bridge circuit, strain gages, potentiometer type displacement transducers etc., into D.C. currents. These D.C. currents carry the measurement information from the field-mounted transmitters to a central control room where the receiving instruments, such as indicators, recorders, controllers, etc., are installed.

Within defined limits the chopper-type D.C.-amplifier output current is independent of the number of series connected receivers and of the resistance of the connection line between the transmitter and the central control room.

As already known said difference in voltage is detected at the input of such chopper-type D.C. amplifiers by a chopper, which is controlled by a separate alternating current generator or by the usual alternating line current.

The transistor choppers for such converting devices which are at present used instead of the former mechanical choppers show however the disadvantage that they require a rather complex push-pull circuit to attain good switching characteristics.

Now a transistor chopper has been found consisting of one transistor which according to the per se known method operates with a grounded collector, receiving the control signal at its base over a diode which is non-conducting for the minimum value of the control signal; and receiving the D.C. voltage to be converted, in series with the voltage developed across the compensation resistor, at the emitter, wherein said voltage developed across the compensation resistor is partly determined by a fixed bias current which compensates for the offset voltage of the transistor chopper in its closed circuit condition.

Referring to the accompanying drawings the invention is hereinafter described by way of an embodiment:

FIG. 1 shows a block diagram of the transmitter; it consists of an alternating current amplifier WV, a demodulator FD, a square wave generator RG; a transistor chopper $Q_1$, the load resistor $R_L$ and the compensation resistor $R_c$.

The input voltage $V_i$ is continuously compared with the voltage developed across $R_c$ by the output current $i_o$. By means of the transistor chopper $Q_1$ any difference between these voltages is converted into a square wave signal, the amplitude and phase of which is determined by the voltage difference and the polarity of both said voltages. After amplification by the alternating current amplifier WV, said square wave signal is phase-sensitive rectified by the demodulator FD.

The output current of the demodulator FD is the output current of the device; it is conducted through the load resistor $R_L$ and also through the compensation resistor $R_c$ as mentioned before. Consequently the circuit is self-correcting and due to the high gain of the alternating current amplifier WV, the difference between $V_i$ and $i_o \cdot R_c$ is insignificant and can be neglected.

The transistor chopper $Q_1$ and the demodulator FD are controlled by the square wave generator RG.

Figure 2:
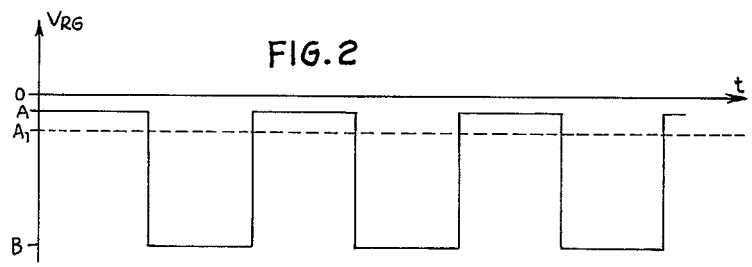
FIG. 2 shows the output voltage of the multivibrator.

The output signal of RG is represented in FIG. 2. Whenever this signal reaches the value B then the transistor chopper $Q_1$ is maintained in closed circuit condition by the negative voltage B' at the base (FIG. 3).

Owing to the base leakage current, an offset voltage originates between the collector and the emitter of $Q_1$ during the closed condition. In order that the square wave signal which is transmitted to the A.C. amplifier WV shall be zero in case $V_i = i_o \cdot R_c$, a bias current $i_b$ is sent through the resistor $R_c$. By means of the potentiometer $P_1$ (zero adjustment of the device) this bias current is adjusted in such a way that $i_b \cdot R_c$ is equal to the offset voltage of $Q_1$ during the closed condition. The potentiometer $P_2$ and an appropriate temperature dependent resistor $R_2$, partly connected in parallel to $P_2$, are provided in the present device for compensating the temperature drift of said offset voltage of $Q_1$. The influence of $R_2$ on the circuit is thus adjusted by means of $P_2$ so that $i_b \cdot R_c$ has the same temperature drift as the aforesaid offset voltage.

In introducing this bias current $i_b$ the present device can also be operated with a suppressed zero voltage. In such case a zero voltage at the input corresponds to a current value differing from the zero at the output. In this case the degree of the zero suppression is adjustable by $P_1$. Said zero suppression is very useful if the present device is used as a measuring converter in control-systems which operate with a D.C. range with a so-called "live zero" or suppressed zero.

Figure 3:
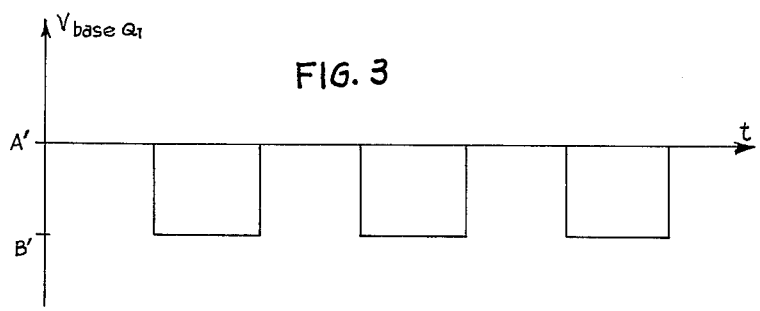
FIG. 3 shows the voltage at the base of the transistor chopper.

To put the transistor chopper $Q_1$ into open condition the base voltage has to be reduced to zero (FIG. 3, level $A'=0$). For this purpose the minimum level A (FIG. 2) of the voltage developed across $R_c$ must be prevented from being conducted to the base of $Q_1$. This is attained by the semi-conductor diode $D_1$ which is connected in series with the base of $Q_1$. Said diode is only rendered conducting at a predetermined voltage $A_1$. Silicon diodes which are rendered conducting only for voltages above 200 to 300 millivolt, are especially appropriate for this purpose. Since the voltage level A of the square wave generator RG (−60 mv.) is selected to be the level $A_1$, the diode will be non-conducting for this voltage level A.

Figure 4:
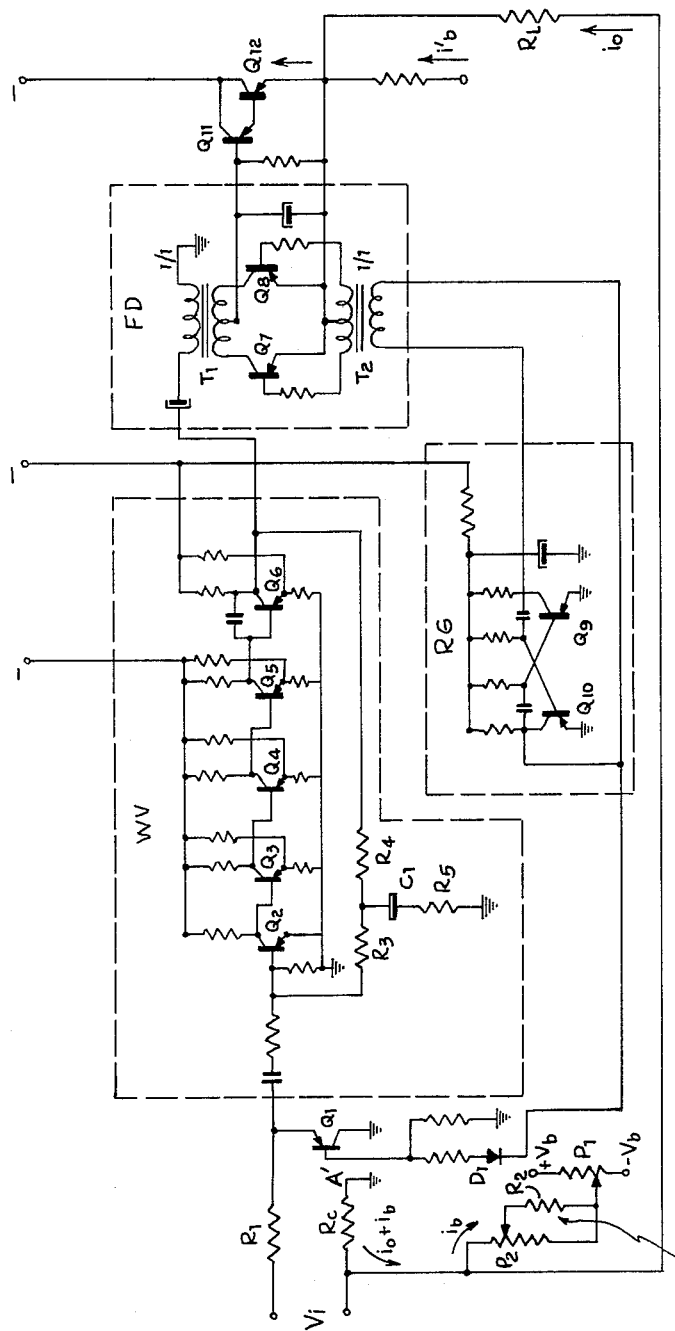
FIG. 4 is a detailed circuit of the chopper-type D.C. amplifier according to FIG. 1.

The alternating current amplifier WV (FIG. 4) is a five-stage high gain transistor amplifier with a direct coupling between the stages for enabling the use of a considerable feedback, whereby a very good stability is attained.

The thermal stability of the operating points of the different stages is assured by a strong D.C. feedback by means of the resistors $R_3$ and $R_3$ from the 5th stage $Q_6$ collector to the base of the 1st stage $Q_2$.

A resistor $R_5$ connected in series with the decoupling capacitor $C_1$ supplies the A.C. feedback, whereby the amplification is made independent of variations of the transistor characteristics. In order to permit said feedback without the appearance of instability, one single dominating element is needed in the amplifier. Therefore transistors $Q_2$, $Q_3$, $Q_4$, $Q_5$ with high cut-off frequency in the first four stages, and the transistor $Q_6$ with low cut-off frequency in the last stage, are provided. The low-pass characteristic of the last stage is still further increased by providing a capacitor between the collector and the base of transistor.

In the demodulator FD two transistors $Q_7$ and $Q_8$ are used. These transistors are controlled by the reference signal of the square wave generator RG, consisting of the transistors $Q_9$ and $Q_{10}$. At the output of this demodulator there is a D.C. voltage which corresponds in magnitude and in polarity to the amplitude and the phase of the output signal of the amplifier WV. The output signal of FD controls a two stage amplifier $Q_{11}$, $Q_{12}$, the output current of which is also the output current of the device. Said output current is sent through the load resistor $R_c$ and through the compensation resistor $R_b$.

A positive bias current $i'_L$ enables the reducing to zero of the output current $i_o$ without the collector current $i_c$ of the D.C. amplifier having to be a zero current.

Figure 1:
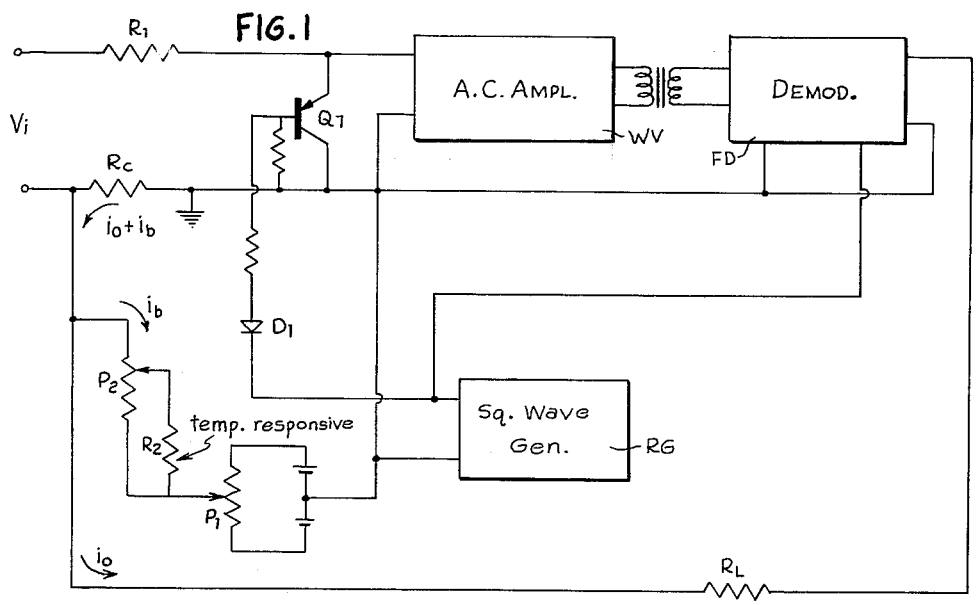
FIG. 1 shows a block diagram of a chopper type D.C. amplifier containing a transistor chopper operating according to the present invention.

The compensation of the offset voltage of $Q_1$ which is dependent on the temperature, and/or the adjustment of a "live zero" as described in FIG. 1, are obtained by the adjustment of the bias current $i_b$ by means of $P_1$, $P_2$ and $R_2$.

We claim:

1. A transistor chopper direct current amplifier of the feedback compensation type for amplifying small input voltages, comprising:
    (a) a chopper transistor having its emitter-collector path connected in series with a compensation resistor and the source of signals to be amplified,
    (b) an alternating current amplifier having its input terminals connected across the emitter-collector path of said transistor for periodic short-circuiting thereby,
    (c) a phase-sensitive demodulator having its signal input connected to the output of said amplifier, and having its output connected serially through a load impedance and said compensation resistor, to develop across the latter a feedback voltage, in series with the signals to be amplified, for difference comparison therewith,
    (d) a square-wave generator connected to supply a reference signal to said demodulator, and
    (e) means for applying the output voltage of said square-wave generator between the base electrode of said chopper transistor and one other electrode thereof, said means comprising a diode characterized by forward conductivity only for applied voltages greater than the lowest potential difference between said generator and said other electrode of the transistor; whereby the base voltage of said transistor is driven to a zero value during alternate half-cycles of said generator.

2. An amplifier in accordance with claim 1, and a transistor biasing circuit connected from said one electrode of said transistor to the common point between said compensation resistor and the source of input signals.

3. An amplifier in accordance with claim 2, said biasing circuit including a temperature-dependent resistor.

References Cited by the Examiner

UNITED STATES PATENTS 3,003,122   10/61   Gerhard _____ 332—31 X

OTHER REFERENCES

Electronic Engineering, August, 1957, Article by Burton, "A Transistor D.C. Chopper Amplifier," pages 393–397.

Electronics, April 24, 1959, Article by Hochwald and Gerhard, "D.C. Operational Amplifier with Transistor Chopper," pages 94, 95.

Inverse Feedback, Edited by A. Schure, John F. Rider Publisher, Inc., New York, 1956, pages 9 and 10.

ROY LAKE, *Primary Examiner.*

NATHAN KAUFMAN, *Examiner.*